(12) United States Patent
Rayole (10) Patent No.: US 9,582,299 B2
(45) Date of Patent: Feb. 28, 2017

(54) ELECTRONIC SYSTEM, ONBOARD MODULAR EXECUTION PLATFORM AND METHOD ENSURING PARTITIONING OF CONFIGURABLE DECISION-MAKING RULES

(71) Applicant: THALES, Neuilly sur Seine (FR)

(72) Inventor: Martin Rayole, Meudon-la-Foret (FR)

(73) Assignee: Thales, Neuilly sur Seine (FR)

( * ) Notice: Subject to any disclaimer, the term of this patent is extended or adjusted under 35 U.S.C. 154(b) by 509 days.

(21) Appl. No.: 14/078,778

(22) Filed: Nov. 13, 2013

(65) Prior Publication Data
US 2014/0137085 A1    May 15, 2014

(30) Foreign Application Priority Data

Nov. 14, 2012 (FR) .................................... 12 03049

(51) Int. Cl.
*G06F 9/455* (2006.01)
(52) U.S. Cl.
CPC .............................. *G06F 9/45508* (2013.01)
(58) Field of Classification Search
CPC ..................................... G06F 8/34; G06F 8/35
USPC .................................................. 717/105, 139
See application file for complete search history.

(56) References Cited

U.S. PATENT DOCUMENTS

| 2012/0089733 | A1 | 4/2012 | Luh et al. | |
|---|---|---|---|---|
| 2013/0275940 | A1* | 10/2013 | Park .......................... | G06F 8/34 717/105 |
| 2015/0019187 | A1* | 1/2015 | Jones ................... | G06F 17/5009 703/8 |

FOREIGN PATENT DOCUMENTS

FR    2 970 577    7/2012

OTHER PUBLICATIONS

Audsley et al.: "The role of timing analysis in the certification of IMA systems," Feb. 17, 1998, pp. 6/1 to 6/6.
(Continued)

*Primary Examiner* — John Chavis
(74) *Attorney, Agent, or Firm* — Davidson, Davidson and Kappel, LLC (57) ABSTRACT

An electronic system, including:
- at least one modular execution platform including a hardware layer and a software layer, the hardware layer including a memory, the software layer including at least one application code,
- an electronic device including a memory capable of storing operational data relative to the or each modular execution platform.

The electronic device includes means for generating intermediate code from said operational data and a source code describing at least one decision-making rule in a programming language, intermediate code including an interpretable and executable part. The software layer of the or each modular execution platform includes at least one decision-making code coupled to said application code, said decision code including a software component capable, when called upon by said application code, of executing said part of the intermediate code received from the electronic device and stored in the memory of the hardware layer, to implement said decision-making rule.

20 Claims, 3 Drawing Sheets

(56) References Cited

OTHER PUBLICATIONS

Schumann et al.:"Certification support for automatically generated programs", system sciences, 2003, proceedings of the 36$^{th}$ annual Hawaii international Conference on Jan. 6 to 9, 2003, Pscataway, NJ, USA IEEE, Jan. 6, 2003, pp. 337-346.

* cited by examiner

ELECTRONIC SYSTEM, ONBOARD MODULAR EXECUTION PLATFORM AND METHOD ENSURING PARTITIONING OF CONFIGURABLE DECISION-MAKING RULES

This claims the benefit of French Patent Application FR 12 030 49, filed Nov. 14, 2013 and hereby incorporated by reference herein.

The present invention relates to an electronic system of the type comprising:

at least one modular execution platform including a hardware layer and a software layer, the hardware layer comprising a memory, the software layer comprising at least one application code, an electronic device capable of being connected to the or each modular execution platform by a data transmission link, the electronic device including a memory capable of storing operational data relative to the or each modular execution platform.

The present invention also relates to an onboard modular execution platform, such as a modular execution platform of the "Integrated Modular Avionics" type, of the type including a hardware layer and a software layer, the hardware layer comprising a memory, the software layer comprising at least one application code.

The invention also relates to a method for implementing at least one decision-making rule within a modular execution platform.

The field of the invention is that of electronic systems comprising onboard modular execution platforms, in particular of the "Integrated Modular Avionics" (IMA) type.

BACKGROUND

With the increased computing power of processors and memory capacities, onboard execution platforms are being asked to integrate a growing number of functionalities that were previously distributed between several separate computers.

Furthermore, an onboard execution platform must meet time constraints that may be quite significant, for example of the real-time type, imposed by the system in which it is implemented.

An electronic system of the aforementioned type is known, comprising an electronic device and several modular execution platforms, each platform being onboard an aircraft. Each modular execution platform is certified before being installed in the associated aircraft.

In such an electronic system, the software layer of each modular execution platform comprises several application codes. Each application code is for example specific for accessing one or more particular hardware resources, for example an input-output controller connected to a peripheral input-output board. The application codes installed within a modular execution platform thus allow that platform to interface with a large number of external peripheral equipment items of different types: computers, proximity electronics, sensors, actuators, communication means, etc.

The electronic device includes means for sending computer code to each modular execution platform. The electronic device is for example an offboard computer. Each modular execution platform then comprises means for downloading code, capable of being connected to the transmission means of the offboard computer. A user can thus use the offboard computer to download new application codes and/or new versions of previously installed application codes on each platform.

Each application code of a modular execution platform includes a code part, in which one or more decision-making rules are programmed. Such decision-making rules, when execution thereof is requested by the associated application code, allow the modular execution platform to decide on an operation to be carried out based on a set of received information.

However, when the user wishes to modify one or more decision-making rules within a modular execution platform, he must modify the content of the concerned application code(s), then in the platform, download a new updated version of that or those application code(s). This requires a new aeronautic certification of the entire platform, which creates extra costs.

SUMMARY OF THE INVENTION

It is an object of the present invention to provide an electronic system allowing the execution, within the or each modular execution platform, of decision-making rules configurable by the user, while not requiring any new aeronautic certification of the entire platform in the event its decision-making rules are modified.

The present invention provides an electronic system of the aforementioned type, characterized in that the electronic device includes means for generating intermediate code from said operational data and a source code describing at least one decision-making rule in a programming language, the intermediate code comprising an interpretable and executable part, and in that the software layer of the or each modular execution platform includes at least one decision-making code coupled to said application code, said decision code including a software component capable, when called upon by said application code, of executing said part of the intermediate code received from the electronic device and stored in the memory of the hardware layer, to implement said decision-making rule.

According to other advantageous aspects of the invention, the electronic system may comprise one or more of the following features, considered alone or according to any technically possible combination(s):

the generating means are capable of compiling the source code in order to obtain a macrocode for describing said at least one decision-making rule, said macrocode comprising instructions resulting from a generic sequence of instructions and forming the interpretable and executable part of the intermediate code;

the operational data comprise, for the or each associated modular execution platform, multiple time parameters, each first time parameter indicating the maximum time for reading, interpreting, and executing an instruction from the sequence of generic instructions on said platform;

the generating means comprise means for computing, for the or each modular execution platform, a second time parameter relative to said platform, from first time parameters associated with said platform, each second time parameter indicating the maximum performance time of the macrocode on said platform;

the software layer of the or each modular execution platform includes a low-level software layer capable of operating as a main operating system for said platform, in that the intermediate code is associated with the or each modular execution platform, and in that the intermediate code further includes a list of data comprising information data indicating the reference and version of the hardware layer, the low-level software layer and the decision code of the or each platform, as well as the or each second time parameter relative to the or one of the platform(s);

the intermediate code further includes a header comprising information relative to the generating means, information relative to the source code, and a datum whereof the value indicates the number of types of modular execution platforms in the list, and in that the intermediate code also includes information indicating the size of the macrocode in bytes, the size of the global variables in bytes, and the size of the local variables in bytes;

the hardware layer of the or each modular execution platform is spatially and temporally partitioned, preferably using a spatial and temporal partitioning according to standard ARINC 653, the or each application code being able to be executed on the partition dedicated to it;

the or each application code is configured so as to have access to data indicating the memory space and the maximum execution time allocated to said application code by the partitioning, said application code being able to determine, from its maximum allocated execution time, the maximum execution time allocated for the associated decision code;

the or each application code includes a software component capable, when said application code calls for execution of the decision-making rule, of requesting that execution of the associated decision code from the software component, by emitting a suitable request;

the or each modular execution platform is an onboard modular execution platform, in particular an onboard modular execution platform of the "Integrated Modular Avionics" type.

The invention also relates to an onboard modular execution platform of the aforementioned type, having a software layer that includes at Least one decision code coupled to said application code, the decision code including a software component capable, when it is called upon by said application code, of executing an executable and interpretable part of intermediate code stored in the memory of the hardware layer, to implement at least one decision-making rule.

The invention present also provides to a method for implementing at least one decision-making rule within a modular execution platform including a hardware layer and a software layer, the hardware layer comprising a memory, the software layer comprising at least one application code and at least one decision code coupled to said application code, the method being characterized in that it includes the following steps:

generating, using an electronic device, intermediate code from data relative to the electronic device, from a list of types of modular execution platforms, operational data relative to the modular execution platform, and source code for describing at least one decision-making rule in a programming language, sending the modular execution platform the generated intermediate code, the memory of the hardware layer storing the transmitted intermediate code, developing a request to initialize the decision-making rule by a software component of the application code, before the first execution of that decision-making rule, interpreting the initialization request by a software component of the decision code, according to a predetermined protocol, developing a request to execute said decision-making rules using said software components of the application code, and executing, using the software component of the decision code, an interpretable and executable part of the intermediate code received from the electronic device and stored in the hardware layer of the modular execution platform, said interpretable and executable part being formed by a macrocode.

Advantageously, the method according to the present invention allows the execution, within the or each modular execution platform, of decision-making rules that can be configured by the user, while guaranteeing the maximum execution time.

Advantageously, the method according to the present invention further makes it possible to guarantee that the execution of the decision-making rules within the or each modular execution platform will not cause memory accesses outside the memory space provided to that end in that platform.

According to other advantageous aspects of the present invention, the method may comprise one or more of the following features, considered alone or according to any technically possible combination(s):

the software layer of the or each modular execution platform includes a low-level software layer capable of operating as the main operating system for said platform, in that the step for generating the intermediate code comprises the computation, by the electronic device, of a general time parameter relative to the modular execution platform, and the grouping together in the intermediate code, by the electronic device, of a header, the macrocode, data comprising said general time parameter, information data (indicating the reference and version of the hardware layer, low-level software layer and decision code of the platform), and information comprising information indicating the size of the macrocode in bytes and the size of the overall variables and the local variables used in the macrocode in bytes;

the initialization request developed by the software component of the application code comprises a maximum execution time value of the associated decision code, and in that the step for interpreting the initialization request comprises the comparison, by the software component of the decision code, between the general time parameter relative to the modular execution platform, appearing in the intermediate code, and the maximum execution time allocated to the decision code;

the initialization request developed by the software component of the application code comprises the memory address of the intermediate code in a nonvolatile storage space of the memory of the hardware layer, and data indicating the memory space allocated to said application code for the macrocode and the global variables, in that the step for interpreting the initialization request comprises the comparison, by the software component of the decision code, between the information indicating the size of the macrocode in bytes and the global variables, that information appearing in the intermediate code, and the data indicating the memory space allocated to said application code, in that the step for interpreting the initialization request comprises the comparison, by the software component of the decision code, between the information indicating the size of the local variables in bytes, appearing in the intermediate code, and the data indicating the memory space allocated to the decision code, and in that the step for interpreting the initialization request comprises copying the macrocode from the nonvolatile storage space of the memory to a volatile storage space of the memory;

the step for interpreting the initialization request comprises the comparison, by the software component of the decision code, between the information relative to the electronic device and the modular execution platforms, appearing in the header of the intermediate code, and data characteristic of the decision code, appearing in the decision code, and the comparison, by the software component of the decision code, between a datum whereof the value indicates the number of types of modular execution platforms, appearing in the header of the intermediate code, and a maximum number of modular execution platforms that can be processed by the decision code during a maximum interpretation time for the initialization request, the maximum number of modular execution platforms appearing in the decision code;

the operational data relative to the modular execution platform comprise multiple elementary time parameters, each elementary time parameter indicating the maximum time for reading, interpreting, and executing an instruction of the macrocode on the platform, and in that the step for generating the intermediate code comprises a sub-step for precompiling the source code during which the maximum number of executions of each instruction of the macrocode during a single execution of said macrocode is stored in the electronic device, the computation of the general time parameter being done from that maximum number of executions and said elementary time parameters.

BRIEF DESCRIPTION OF THE DRAWINGS

The features and advantages of the present invention will appear upon reading the following description, provided solely as a non-limiting example, and done in reference to the appended drawings, in which.

DETAILED DESCRIPTION

The present invention shows an electronic system 10 comprising an electronic device 12 and at least one modular execution platform 14.

Figure 1:
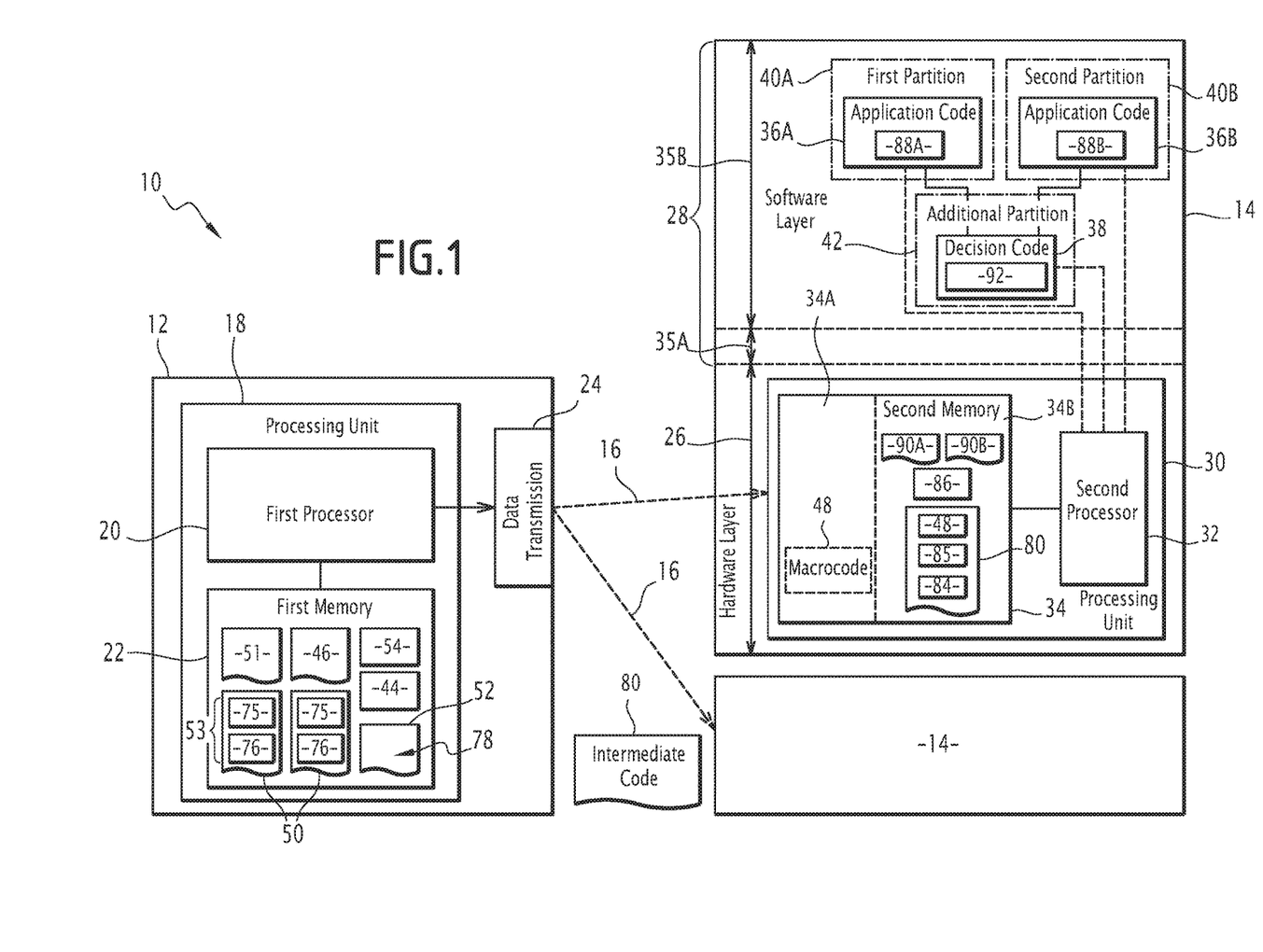
FIG. 1 is a schematic illustration of an electronic system according to the present invention, comprising an electronic device including a source code, and two modular execution platforms each including intermediate code.

In the example embodiment of FIG. 1, the electronic system 10 comprises two modular execution platforms 14. Each modular execution platform 14, called "platform" in the rest of the document, is advantageously onboard an aircraft. More particularly, each platform 14 is for example an onboard modular execution platform of the "Integrated Modular Avionics" type. The two platforms 14 are associated, in the example embodiment, with different aircraft types. In other words, the two platforms 14 belong to different platform types.

Each platform 14 can be connected to the electronic device 12 by a data transmission link 16. Each link 16 is preferably a secured wired link, for example according to standard ARINC 664 P7. Alternatively, each link 16 is a non-wired link, for example a wireless link according to standard IEEE 802.11.

The electronic device 12 includes a first information processing unit 18, for example formed by a first processor 20 associated with a first memory 22. The electronic device 12 further includes data transmission means 24, connected to the first processor 20.

The electronic device 12 is for example an offboard computer.

Each platform 14 according to the present invention includes a hardware layer 26 and a software layer 28. Hereafter, for simplification purposes, only the structure of one of the platforms 14 is outlined, the structure of the other platform 14 being identical.

The hardware layer 26 includes a second information processing unit 30 for example formed by a second processor 32 associated with a second memory 34. The second memory 34 comprises a volatile storage space 34A, for example of the random-access memory type. The second memory 34 also comprises a nonvolatile storage space 34B, for example of the rewritable semiconductor mass memory type, also called flash memory.

The hardware layer 26 is advantageously spatially and temporally partitioned. A partition corresponds to the domain over which an application code of the software layer can be executed. It involves both a spatial domain, in terms of areas of the memory 34 that can be addressed by the application code, and a time domain, in terms of time intervals during which the application code is executed and accesses the resources of the hardware layer.

The different partitions of the system are spatially and temporally separated. Preferably, the spatial and time partitioning of the hardware layer 26 is in accordance with standard ARINC 653.

The software layer 28 includes a low-level software layer 35A and an application software layer 35B.

The low-level software layer 35A forms an interface between the application software layer 35B and the processor 32, and operates as the main operating system for the platform 14, to virtualize components of the hardware layer 26 that do not evolve over the course of the development or use of the platform 14.

The application software layer 35B includes at least one application code and at least one decision code coupled to said application code. In the example embodiment of FIG. 1, the application software layer 35B includes a first application code 36A and a second application code 36B. It also includes a decision code 38, coupled to each application code 36A, 36B. Each application code 36A, 36B is for example generated by an external compiler, then downloaded within the application software layer 35B.

The first application code 36A is associated with a first partition 40A, and the second application code 36B is associated with a second partition 40B. The first application code 36A, the second application code 36B, respectively, is capable of being executed on the first partition 40A, on the second partition 40B, respectively. In the example embodiment, the decision code 38 is associated with an additional partition 42, and is capable of being executed on that partition 42. The partitions 40A, 40B, 42 are separated from each other.

In an alternative, the application software layer 35B includes as many decision codes as there are application codes needing to call on a decision code. Each decision code is coupled to a single application code and can be executed on the same partition as that application code.

The first memory 22 is able to store code compilation software 44. The code compilation software 44 is capable, when executed by the first processor 20, of compiling an input source code 46 and thus generating an interpretable and executable macrocode 48. The compilation software 44 is configured so as not to insert any alignment byte between the declared variables in the source code 46, during the compilation of the input source code 46.

The first memory 22 is also capable of storing the input source code 46, and at least one file 50. In the example embodiment of FIG. 1, the first memory 22 is capable of storing two files 50. The first memory 22 is also capable of storing a first additional file 51 and a second additional file 52.

Each file 50 is advantageously pre-implanted in the first memory 22. Alternatively, each file 50 is generated by an external module (not shown), the external module being connected, by the first processor 20, to the first memory 22 of the electronic device 12. Each file 50 comprises operational data 53 relative to a platform type 14.

Figure 3:
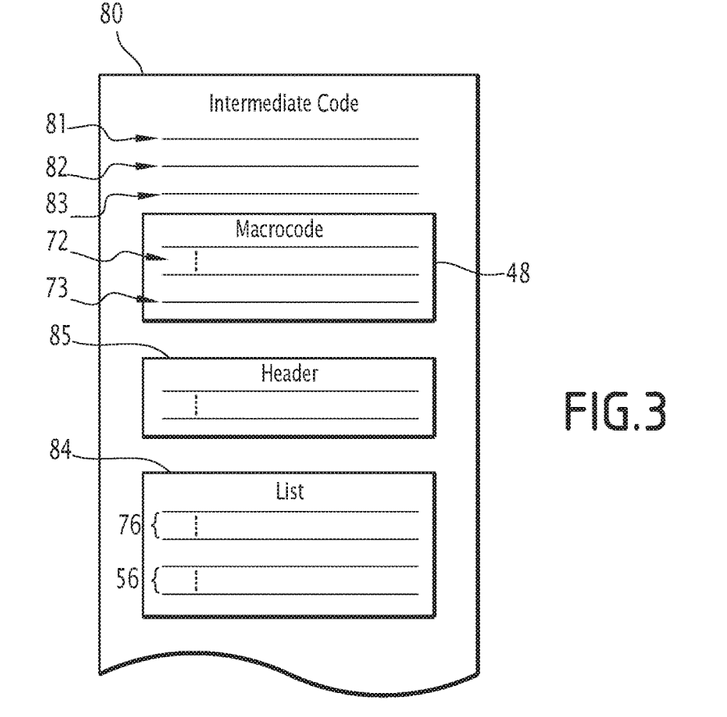
FIG. 3 is a schematic illustration of the component elements of the intermediate code of FIG. 1.

The first memory 22 is also capable of storing computation software 54, from operational data 53 relative to a platform type 14, for computing a general time parameter 56 relative to each platform 14 of that type, as illustrated in FIG. 3.

Figure 2:
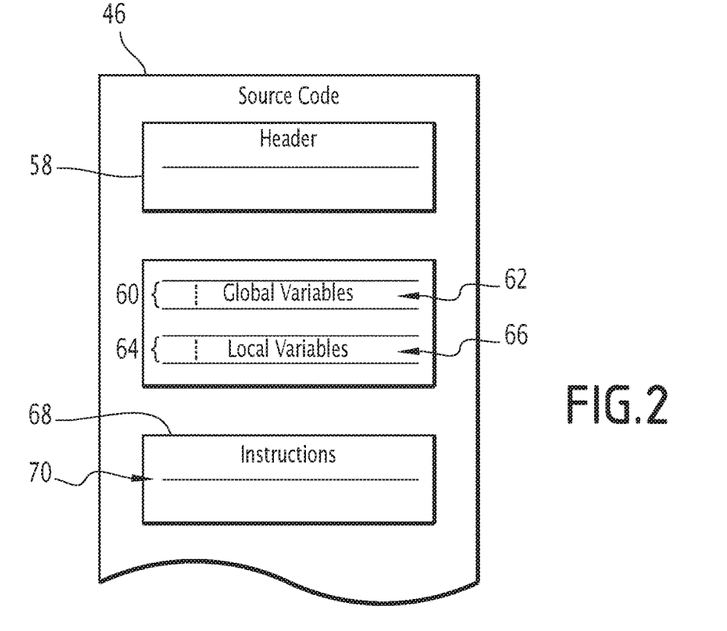
FIG. 2 is a schematic illustration of the component elements of the source code of FIG. 1.

As shown in FIG. 2, the source code 46 is a file comprising a header 58, a list 60 of global variables 62, and a list 64 of local variables 66. The source code 46 further comprises a sequence 68 of instructions 70 describing at least one decision-making rule in a programming language of the procedural type.

In the example embodiment, the sequence 68 of instructions 70 describes a single decision-making rule. Such a decision-making rule, when implemented by a computer application, allows the computer application to decide on an operation to be performed based on a received set of information. Such a decision-making rule is for example a rule allowing a platform containing several modules to decide which modules should be stopped when a power failure occurs within that platform, based on the criticality of the operations performed in each module.

The header 58 comprises information relative to the reference and version of the source code 46.

The global variables 62 are visible and accessible to a third-party application calling on the source code 46. They are in particular capable of being used as communication means between each application code 36A, 36B and the decision code 38.

The local variables 66 are only visible inside the source code 46.

The sequence 68 of instructions 70 of the source code 46 is configurable by the user. The sequence 68 of instructions 70 does not include instructions calling on pointers. Furthermore, in the example embodiment, the sequence 68 of instructions 70 advantageously does not include definitions of functions and/or procedures, or "hop" instructions. Alternatively, the sequence 68 of instructions 70 includes definitions of functions and/or procedures, and/or "hop" instructions.

As shown in FIG. 3, the macrocode 48 comprises several generic instructions 72 describing the decision-making rule, the generic instructions 72 in particular comprising access to the global variables 62. The macrocode 48 further comprises an end instruction 73 capable of returning a return value. The return value returned by the end instruction 73 indicates whether the macrocode 48 has been executed correctly, or if that execution was interrupted following the detection of an error.

The operational data 53 relative to a platform type comprise several elementary time parameters 75, and information data 76, as illustrated in FIG. 1.

Each elementary time parameter 75 indicates the maximum time for reading, interpreting, and executing a generic instruction 72 of the macrocode 48 on a platform of the associated type.

The information data 76 for example include, for the associated platform type, a datum indicating the reference and version of the hardware layer 26 of each platform of that type, a datum indicating the reference and version of the low-level software layer 35A of each platform of that type, and a datum indicating the reference and version of the decision code 38 installed within each platform of that type.

The first additional file 51 includes several data, each datum indicating, for a generic instruction 72 of the macrocode 48, the maximum number of executions of that instruction 72 during a single execution of the macrocode 48.

The second additional file 52 is formed by a list 78. The list 78 groups together the references and versions of all of the types of platforms considered for the electronic system 10.

The computation software 54 is capable of computing, for each platform 14, the general time parameter 56 associated with that platform, from elementary time parameters 75 associated with the platforms of the same type, and data appearing in the additional file 51.

Each general time parameter 56 indicates the maximum performance time of the macrocode 48 on the associated platform 14.

The first processor 20 is capable of generating intermediate code 80 associated with the set of platforms 14 from the source code 46, the list 78 and the operational data 53.

The first processor 20 is further advantageously capable of determining the size of the macrocode 48 in bytes, the size of the global variables 62 in bytes, and the size of the local variables 66 in bytes.

The first processor 20 is also advantageously capable of determining the reference and version of the compilation software 44, and the reference and version of the source code 46 contained in its header 58.

As shown in FIG. 3, the intermediate code 80 is a file comprising the macrocode 48, information 81 indicating the size of the macrocode 48 in bytes, information 82 indicating the size of the global variables 62 in bytes, and information 83 indicating the size of the local variables 66 in bytes. The intermediate code 80 further comprises a list 84 of data relative to the platforms 14, as well as a header 85.

The list 84 comprises the information data 76 for the operational data 53 relative to each type of platform 14, as well as the general time parameter 56 relative to each platform 14.

Additionally, the list 84 comprises a datum indicating the reference and version of each file 50. This makes it possible to improve the traceability and maintenance of the electronic system 10.

The header 85 comprises the reference and version of the compilation software 44, the reference and version of the source code 46, and a datum indicating the number of types of platforms 14 considered in the list 84, and corresponding to the number of types of platforms 14 of the electronic system 10. In the example embodiment of FIG. 1, the value of this datum is equal to two.

The transmission means 24 are means traditionally known for emitting electronic data, for example formed by a dedicated integrated circuit. The transmission means 24 are in particular capable of transmitting data comprising computer code. Alternatively, the transmission means 24 are made in the form of software components, or in the form of programmable logic circuits.

The volatile storage space 34A is capable of storing a copy of the macrocode 48, shown in dotted lines in FIG. 1.

The nonvolatile storage space 34B is capable of storing software 86 for downloading, from the device 12, electronic data such as data comprising the computer code.

The downloading software 86 is capable of downloading electronic data comprising the computer code from the device 12. In particular, the downloading software 86 is capable of using one of the links 16 to download the intermediate code 80 from the device 12.

The first application code 36A, the second application code 36B, respectively, includes a first software component 88A, a second software component 88B, respectively.

The first application code 36A, the second application code 36B, respectively, is configured so as to have access to a first file 90A, a second file 90B, respectively, comprising data indicating the memory space and the maximum execution time allocated to it by the partitioning. Each file 90A, 90B is stored in the nonvolatile storage space 34, and is for example formed by a configuration table pre-implanted in the nonvolatile storage space 34B. Each application code 36A, 36B is in fact capable of accessing the hardware layer 26. More particularly, each application code 36A, 36B is capable of accessing the second processor 32 of the second processing unit 30.

Each application code 36A, 36B is further capable of determining, from its maximum allocated execution time, the maximum execution time allocated for the decision code 38.

Each application code 36A, 36B is also capable of reading and extracting, in the nonvolatile storage space 34B of the second memory 34, the address of the intermediate code 80, the macrocode 48 and the global variables 62 stored in that nonvolatile storage space 34B. Each application code 36A, 36B is thus capable of implementing the global variables 62 to provide a knowledge base for the decision code 38.

The first application code 36A, the second application code 36B, respectively, is also capable of calling on the first software component 88A, the second software component 88B, respectively, to initialize or execute the decision-making rule.

The decision code 38 includes a third software component 92. The decision code 38 is capable of accessing the hardware layer 26. More particularly, the decision code 38 is capable of accessing the second processor 32 of the second processing unit 30.

The software component 88A, 88B of each application code 36A, 36B is capable of developing a request to initialize the decision-making rule. The software component 88A, 88B of each application code 36A, 36B is further capable of developing an execution request to execute the decision-making rule, and sending each initialization or execution request to the third software component 92.

Each initialization request developed by the software component 88A, 88B for an application code 36A, 36B comprises the data indicating the memory space allocated to that application code 36A, 36B, the maximum execution time allocated to the decision code 38, and the memory address of the intermediate code 80 stored in the nonvolatile storage space 34B of the second memory 34.

In particular, the data indicating the memory space allocated to an application code 36A, 36B comprises a memory address of the global variables 62 and the memory address of the volatile storage space 34A within which the copy of the macrocode 48 must be loaded. More particularly, the data indicating the memory space allocated to an application code 36A, 36B comprises a memory address of the beginning of the global variables 62, as well as the memory address of the last byte of the last global variables 62 appearing in the macrocode 48. This allows the decision code 38 to determine the theoretical size in bytes of the global variables 62 and to thereby verify, by comparison, that the external compiler that generated the application code 36A, 36B did not add alignment bytes between the global variables 62.

The third software component 92 is capable of interpreting a request to initialize or execute the decision-making rule. More particularly, the third software component 92 is capable of comparing the information data 76 appearing in the intermediate code 80 with the characteristic data of the platform 14 on which the software component 92 is being executed. The third software component 92 is also capable of comparing the general time parameter 56 of the associated platform 14, that parameter 56 appearing in the intermediate code 80, with the maximum execution time allocated to the decision code 38. It is also capable of comparing the information 81, 82 indicating the size of the macrocode 48 in bytes and the size of the global variables 62 in bytes with the data indicating the memory space allocated to the application code 36A, 36B. It is also capable of comparing the information 83 indicating the size of the local variables 66 in bytes with the data indicating the memory space allocated to the decision code 38. The third software component 92 is further capable of comparing the data from the header 85 with data characteristic of the decision code 38, stored in the decision code 38.

The third software component 92 is also capable of sending the software component 88A, 88B of each application code 36A, 36B an identifier referring to the decision-making rule.

The third software component 92 is also capable of reading the macrocode 48 stored in the nonvolatile storage space 34B of the second memory 34, and copying it into the volatile storage space 34A. The third software component 92 is also capable of reading, interpreting, and executing that copy of the macrocode 48 stored in the volatile storage space 34A to implement the decision-making rule.

One skilled in the art having normal skills in application programming for modular execution platforms knows how to program the aforementioned applications 36A, 36B, 38 to use and perform the aforementioned functions. Consequently, the specific programming codes for the application codes 36A, 36B and the decision code 38 are not described in more detail.

Figure 4:
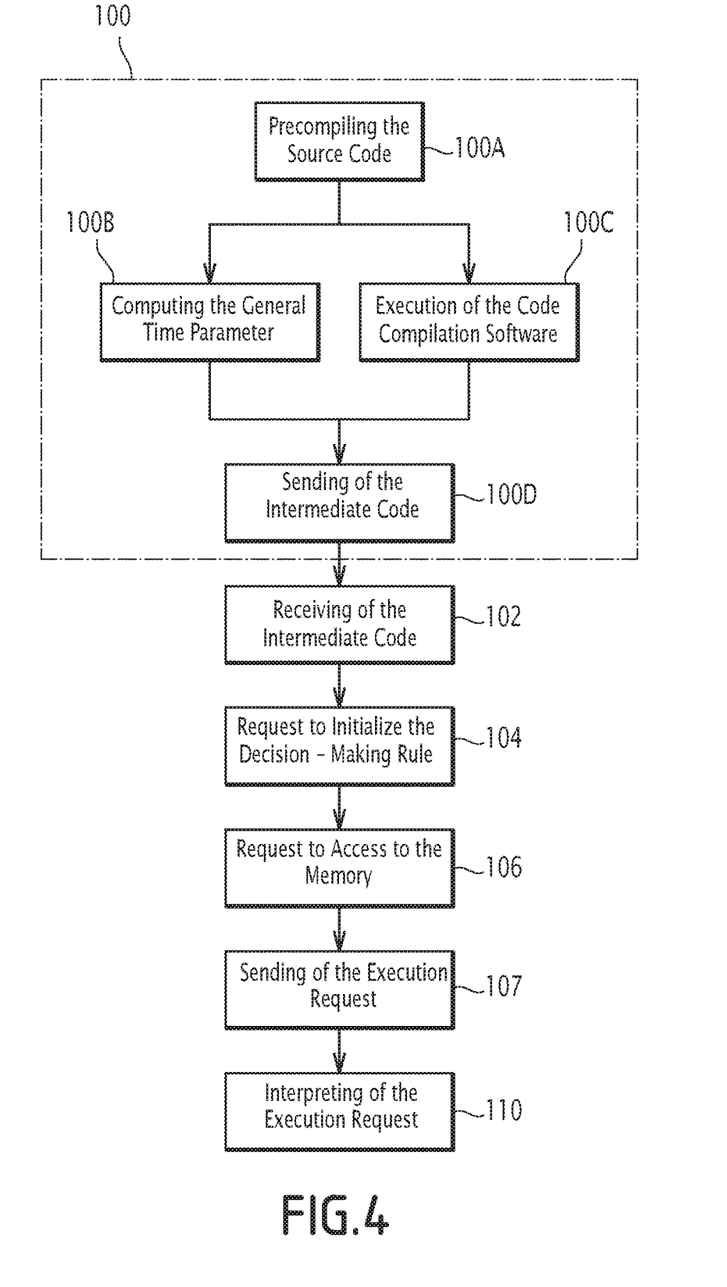
FIG. 4 is a flowchart of a method implemented for at least one decision-making rule within a modular execution platform according to the present invention.

The operation of the electronic system 10 will now be described using FIG. 4, which shows a flowchart of the method for implementing at least one decision-making rule within one of the platforms 14. One skilled in the art will of course understand that the method according to the present invention is implemented in the same way in the other platform 14 of the example embodiment of FIG. 1, and more generally in each platform of the electronic system 10.

Initially, the source code 46 and the files 50, 52 are stored in the first memory 22, and the files 90A, 90B are stored in the nonvolatile storage space 34B of the second memory 34. Furthermore, the platform 14 is connected to the electronic device 12 using the secure wired link 16.

Furthermore, the entire electronic system 10 is subject to certification. In the advantageous example embodiment in which each platform 14 is an onboard platform on an aircraft, the electronic system 10 is certified according to an aeronautic standard, for example standard RTCA DO-178 ("Software considerations in airborne systems and equipment certification").

During an initial step 100, the first processor 20 of the electronic device 12 generates the intermediate code 80 from the source code 46, files 50 relative to the types of platforms 14, and the second additional file 52. This step is illustrated in detail in FIG. 4.

During a step 100A for precompiling the source code 46, the first processor 20 executes the code compilation software 44. The compilation software 44 then replaces, in the source code 46, each loop instruction 70 with a hop instruction to a fixed line of the source code 46. During that same step 100A, the first memory 22 stores, for each instruction 70 of the source code 46, the maximum number of executions of that instruction 70 during a single execution of the program describing the decision-making rule. The first memory 22 then stores those different data, in the form of the additional files 51. During that same step 100A, the compilation software 44 adds the end instruction 73 to the sequence 68 of instructions 70 of the source code 46. It also adds, to that sequence of instructions, test instructions not to exceed the size of the tables used in the program, and test instructions not to divide by zero, such instructions being traditionally known. These instructions added by the compilation software 44, as well as the limitations of the sequence of instructions 70 described above, guarantee that the instructions 70 do not access a memory area situated outside the memory area allocated to the global and local variables.

During a subsequent step 100B, for each of the platforms 14 associated with a type of platforms listed in the additional file 52, the general time parameter 56 is computed using the computation software 54, from the corresponding file 50 and the additional file 51. More specifically, the general time parameter 56 is computed from elementary time parameters 75 contained in the file 50, and data from the additional file 51 indicating the maximum number of executions of each program instruction. The general time parameter 56 corresponds to the maximum time the macrocode 48 will take to be executed on the platform 14. In other words, the general time parameter 56 corresponds to the time the macrocode 48 will take to be fully executed on the platform 14 when the "worst" execution path for its instructions 72 is used, in terms of the execution time (WCET, Worst-Case Execution Time).

The general time parameter 56 is for example computed through the implementation, by the computation software 54, of a traditional WCET computation algorithm. Such an algorithm for example comprises a step for transcribing the source code 46 in the form of an acyclic oriented graph, then a tri-topology step for the apices of the graph, each apex representing an instruction resulting from precompiling 100A the source code, and lastly an iterative computation step, for each apex of the graph, for computing an intermediate time parameter relative to that graph, the general time parameter 56 being considered to be equal to the maximum value of all of the computed intermediate time values. At the end of step 100B, each general time parameter 56 associated with a platform 14 is stored in the first memory 22.

In parallel with step 100B, during a step 100C for compiling the source code 46, the first processor 20 executes the code compilation software 44. The compilation software 44 then generates the macrocode 48 from the precompiled source code in step 100A. More particularly, the code compilation software 44 translates the sequence of instructions from the precompiled source code into a sequence of generic instructions 72. The generic instructions 72 are independent from the platform 14 within which the macrocode 48 will be executed.

For example, such generic instructions could be: "read a variable", or "sum of two variables", or "conditional connection using a Boolean".

At the end of step 100C, the first memory 22 stores the macrocode 48.

During a subsequent step 100D, the first processor 20 groups together, in a single file 80, the header 85, the information data 76 for each file 50 associated with a platform type 14 listed in the additional file 52, the general time parameters 56, and the macrocode 48. The first processor 20 further determines the size of the macrocode 48 in bytes, the size of the global variables 62 in bytes, and the size of the local variables 66 in bytes, and groups that information 81, 82, 83 together in the file 80. The first processor 20 thus generates the intermediate code 80. At the end of the step 100D, the first processor 20 sends the intermediate code 80 to the transmission means 24.

At the end of step 100, a subsequent step 102 is carried out. During that step 102, the transmission means 24 send the intermediate code 80 to the platform 14, via the data transmission link 16. At the end of step 102, the downloading software 86 of the platform 14 receives the intermediate code 80, and the nonvolatile storage space 34B of the platform 14 stores the intermediate code 80.

During a subsequent step 104, one of the application codes 36A, 36B, for example the first application code 36A, requests access to the second memory 34 from the second processor 32. The first application code 36A then accesses the first file 90A, and extracts the data indicating the memory space and the maximum execution time that are allocated to it by the partitioning. The first application code 36A then determines, for its maximum allocated execution time, the maximum execution time allocated to the decision code 38. During that same step 104, the first application code 36A also extracts the address of the intermediate code 80 stored in the nonvolatile storage space 34B of the second memory 34 from that second memory 34. During the same step 104, the first application code 36A further calls on the first software component 88A to initialize the decision-making rule contained in the macrocode 48.

During the same step 104, the first software component 88A develops a request to initialize the decision-making rule, comprising the memory address of the intermediate code 80, the data indicating the memory space allocated to the first application code 36A, the maximum execution time allocated to the decision code 38, and the memory address where the copy of the macrocode 48 must be loaded in the volatile storage space 34A of the second memory 34. At the end of step 104, the first software component 88A sends the initialization request to the third software component 92 of the decision code 38. The third software component 92 determines the theoretical size of the global variables 62 from data indicating the memory space allocated to the first application code 36A.

During a subsequent step 106, the decision code 38 requests access to the second memory 34 from the second processor 32. The decision code 38 then accesses the intermediate code 80, and extracts the data from the header 85, the information data 76, the general time data 56 associated with the platform 14 and the information 81 indicating the size of the macrocode 48 in bytes, the information 82 indicating the size of the global variables 62 in bytes, and the information 83 indicating the size of the local variables 66 in bytes.

During this same step 106, the third software component 92 of the decision code 38 interprets the initialization request using a predetermined protocol.

The protocol for interpreting the request comprises a verification, by the third software component 92, that the reference and version of the platform, appearing in the corresponding information data 76, are identical to the reference and version of the platform 14.

The protocol for interpreting the request also comprises a first comparison, by the third software component 92, between the general time parameter 56 and the maximum execution time allocated to the decision code 38. If the value of the general time parameter 56 is less than or equal to the value of the maximum execution time allocated to the decision code 38, the first comparison is "positive".

The protocol for interpreting the request further comprises a second comparison, by the third software component 92, between the information 81, 82, 83 indicating the size of the macrocode 48 in bytes and the size of the global variables 62 and local variables 66 in bytes, and the data indicating the memory space allocated to the first application code 36A. If the size of the macrocode 48 in bytes is less than or equal to the size of the dedicated memory space allocated to the first application code in bytes, and if the size of the local variables 66 in bytes is less than or equal to the size of the dedicated memory space allocated to the execution code 38 in bytes, and if the size of the global variables 62 in bytes is exactly equal to the theoretical size of the global variables 62, then the second comparison is "positive".

The protocol for interpreting the request also comprises a third comparison, by the third software component 92, between the data from the header 85 and the data characteristic of the decision code 38. In particular, the third software component 92 compares, during that third comparison, the value of the data indicating the number of platform types 14, appearing in the header 85, with a maximum value of platforms 14 able to be processed by the decision code 38 during a maximum time for interpreting the initialization request, that value appearing in the detection code 38. The third software component 92 also verifies, during the third comparison, that the reference and version of the decision code 38 are compatible with the reference and version of the compilation software 44. If the value of the data indicating the number of types of platforms 14, appearing in the header 85, is less than or equal to the maximum value appearing in the decision code 38, and if the reference and version of the compilation software 44 are compatible with the reference and version of the decision code 38, then the third comparison is "positive".

If the first, second and third comparisons are all "positive", the third software component 92 copies the macrocode 48 in an area of the volatile storage space 34A. The third software component 92 then requests, during that same step 106, access to the second memory 34 from the second processor 32. The second memory 34 then stores the memory address of the copy of the macrocode 48 in the volatile storage space 34A, the memory address of the beginning of the global variables 62 in the volatile storage space 34A, and the memory address of the beginning of the local variables 66 in the volatile storage space 34A. The third software component 92 then returns an identifier referring to the decision-making rule to the first software component 88A. For example, the returned identifier corresponds to the memory address where the third software component 92 has stored, in the volatile storage space 34A, the memory addresses of the macrocode 48, the beginning of the global variables 62, and the beginning of the local variables 66. A subsequent step 107 is then carried out.

Otherwise, the third software component 92 returns an error code to the first software component 88A. The method then ends in step 106.

During the following step 107, the first software component 88A develops an execution request to execute the decision-making rule, comprising the identifier returned by the third software component 92 during step 104. At the end of step 107, the first software component 88A sends the execution request to the third software component 92.

During a subsequent step 110, the third software component 92 interprets the execution request, then reads, interprets and executes a copy of the macrocode 48 stored in the volatile storage space 34A of the second memory 34. At the end of this step 110, the third software component 92 returns a return value to the first software component 88A.

If the macrocode 48 has been executed correctly, the return value returned is the return value contained in the end instruction 73. The decision-making rule is then implemented within the platform 14.

Otherwise, the return value returned indicates that the execution did not occur correctly, and also indicates the nature of the detected error.

If the user wishes to modify the decision-making rule described by the macrocode 48, he modifies the source code 46 accordingly, and loads that modified source code 46 into the first memory 22. The modified part of the source code 46 is then subject to a new certification, for example according to an aeronautic standard of type DO-178, and the initial step 100 is then carried out again.

If the user does not wish to modify the decision-making rule described by the macrocode 48, step 107 is carried out again.

One can thus see that the electronic system 10 according to the present invention allows the execution, within each modular execution platform 14, of decision-making rules configurable by the user, while not requiring a new aeronautic certification of the entire platform 14 in the event these decision-making rules are modified. When such a modification occurs, only the code elements associated with the modified decision-making rule are certified again. This advantageously makes it possible to reduce the costs relative to the prior art solutions.

The generic instructions 72 of the macrocode 48 being independent of the platform on which the macrocode 48 will be executed, and the files 50 pre-implanted in the first memory 22 being able to be generated for any type of platform, the electronic system 10 according to the present invention advantageously operates with all possible types of modular execution platforms, in particular with onboard or offboard platforms, or with onboard platforms on aircraft of different types, and according to all possible combinations between those characteristics.

Although the two platforms 14 are associated, in the example embodiment, with different aircraft types, one skilled in the art will understand that the platforms 14 of the electronic system 10 according to the present invention may or may not be associated with different types of aircraft.

Furthermore, owing to the first comparison done by the third software component 92, a method according to the present invention makes it possible to guarantee the maximum execution time of the decision-making rules within the or each modular execution platform.

Furthermore, owing to the second comparison done by the third software component 92, a method according to the present invention also makes it possible to guarantee that the execution of the decision-making rules within the or each modular execution platform will not cause memory accesses outside the memory space provided to that end in that platform.

The invention claimed is:

1. An electronic system comprising:
   at least one modular execution platform including:
      a hardware layer including a memory; and
      a software layer including at least one application code and at least one decision-making code coupled to the application code;
   an electronic device connected to the at least one modular execution platform by a data transmission link, the electronic device including:
      a memory storing operational data relative to the at least one modular execution platform;
      a processing unit generating an intermediate code from the operational data, the intermediate code including an interpretable and executable part; and
      a source code describing at least one decision-making rule in a programming language;
   the at least one decision-making code including a software component executing, when called upon by the application code, the executable part of the intermediate code received from the electronic device and stored in the memory of the hardware layer, to implement the at least one decision-making rule.

2. The electronic system according to claim 1, wherein the processing unit compiles the source code in order to obtain a macrocode for describing the at least one decision-making rule, the macrocode including instructions resulting from a generic sequence of instructions and forming the interpretable and executable part of the intermediate code.

3. The electronic system according to claim 2, wherein the operational data include for the at least one associated modular execution platform, a plurality of elementary time parameters, each elementary time parameter indicating a maximum time for reading, interpreting, and executing the instructions from the sequence of generic instructions on the platform.

4. The electronic system according to claim 3, wherein the processing unit includes a processor and computation software for computing, for the at least one modular execution platform, a second time parameter relative to the platform, from first time parameters associated with the platform, each second time parameter indicating a maximum performance time of the macrocode on the platform.

5. The electronic system according to claim 4, wherein the software layer of the at least one modular execution platform includes a low-level software layer capable of operating as a main operating system for the platform, the intermediate code being associated with the at least one modular execution platform and further including a list of data including information data indicating a reference and version of the hardware layer, the low-level software layer, the decision code and each second time parameter relative to the at least one platform.

6. The electronic system according to claim 5, wherein the intermediate code further includes a header including information relative to the processing unit, information relative to the source code, and a datum value indicating a number of types of modular execution platforms in a list, the intermediate code including information indicating a size of the macrocode in bytes, a size of global variables in bytes, and a size of local variables in bytes.

7. The electronic system according to claim 1, wherein the hardware layer is spatially partitioned and temporally partitioned, the at least one each application code being able to be executed on the partition dedicated to the at least one each application code.

8. The electronic system according to claim 7, wherein the hardware layer is partitioned in accordance with standard ARINC 653.

9. The electronic system according to claim 7, wherein the at least one application code is configured so as to have access to data indicating a memory space and a maximum execution time allocated to the at least one application code by the partitioning, the at least one application code being able to determine, from the maximum allocated execution time, a maximum execution time allocated for the at least one decision-making code.

10. The electronic system according to claim 1, wherein the application code includes a further software component, when the at least one application code calls on the further software component to execute the decision-making rule, the further software component emits a suitable request to the software component.

11. The electronic system according to claim 1, wherein the at least one modular execution platform is an onboard modular execution platform.

12. The electronic system according to claim 11, wherein the onboard modular execution platform is an "Integrated Modular Avionics" platform.

13. An onboard modular execution platform comprising:
    a hardware layer including a memory; and
    a software layer including at least one application code and at least one decision code coupled to the at least one application code;
    the decision code including a software component capable, when called upon by the application code, of executing an executable and interpretable part of an intermediate code stored in the memory of the hardware layer, to implement at least one decision-making rule.

14. The onboard modular execution platform according to claim 13, wherein the onboard modular execution platform is an "Integrated Modular Avionics" platform.

15. A method for implementing at least one decision-making rule within a modular execution platform including a hardware layer and a software layer, the hardware layer including a memory, the software layer including at least one application code and at least one decision code coupled to the at least one application code, the method comprising the steps of:
    generating, using an electronic device, an intermediate code from data relative to the electronic device, from a list of types of modular execution platforms, operational data relative to the modular execution platform, and a source code for describing at least one decision-making rule in a programming language;
    sending the modular execution platform the generated intermediate code, the memory of the hardware layer storing the transmitted intermediate code;
    developing an initialization request to initialize the at least one decision-making rule by a software component of the at least one application code, before a first execution of the at least one decision-making rule;
    interpreting the initialization request by a software component of the decision code, according to a predetermined protocol;

developing a request to execute the at least one decision-making rule using the software components of the application code; and executing, using the software component of the decision code, an interpretable and executable part of the intermediate code received from the electronic device and stored in the hardware layer of the modular execution platform, the interpretable and executable part being formed by a macrocode.

16. The method according to claim 15, wherein the software layer of the at least one modular execution platform includes a low-level software layer capable of operating as a main operating system for the at least one modular execution platform, and wherein the step for generating the intermediate code includes a computation, by the electronic device, of a general time parameter relative to the at least one modular execution platform, and a grouping together in the intermediate code, by the electronic device, of a header, the macrocode, data comprising the general time parameter, information data indicating a reference and version of the hardware layer, low-level software layer and decision code of the platform, and information including information indicating a size of the macrocode in bytes and a size of overall variables and local variables used in the macrocode in bytes.

17. The method according to claim 16, wherein the step for interpreting the initialization request includes a comparison, by the software component of the decision code, between the information relative to the electronic device and the at least one modular execution platform, appearing in the header of the intermediate code, and data characteristic of the decision code, appearing in the decision code, and a further comparison, by the software component of the decision code, between a datum value indicating a number of types of modular execution platforms, appearing in the header of the intermediate code, and a maximum number of modular execution platforms that can be processed by the decision code during a maximum interpretation time for the initialization request, the maximum number of modular execution platforms appearing in the decision code.

18. The method according to claim 16, wherein the operational data relative to the modular execution platform includes a plurality of elementary time parameters, each elementary time parameter indicating a maximum time for reading, interpreting, and executing an instruction of the macrocode on the platform, wherein the step for generating the intermediate code includes a sub-step for precompiling the source code during which a maximum number of executions of each instruction of the macrocode during a single execution of the macrocode is stored in the electronic device, the computation of the general time parameter being done from the maximum number of executions and the elementary time parameters.

19. The method according to claim 16, wherein the initialization request developed by the software component of the at least one application code includes a maximum execution time value of the decision code, and wherein the step for interpreting the initialization request includes a comparison, by the software component of the decision code, between the general time parameter relative to the at least one modular execution platform, appearing in the intermediate code, and the maximum execution time allocated to the decision code.

20. The method according to claim 19, wherein the initialization request developed by the software component of the at least one application code includes a memory address of the intermediate code in a nonvolatile storage space of the memory of the hardware layer, and data indicating memory space allocated to the at least one application code for the macrocode and the global variables, wherein the step for interpreting the initialization request includes a comparison, by the software component of the decision code between the information indicating the size of the macrocode in bytes and the global variables, the information appearing in the intermediate code, and the data indicating the memory space allocated to the at least one application code, and the step for interpreting the initialization request includes a further comparison, by the software component of the decision code, between the information indicating the size of the local variables in bytes, appearing in the intermediate code, and the data indicating the memory space allocated to the decision code, and the step for interpreting the initialization request includes copying the macrocode from the nonvolatile storage space of the memory to a volatile storage space of the memory.

* * * * *